United States Patent [19]

Yasue et al.

[11] Patent Number: 4,498,835
[45] Date of Patent: Feb. 12, 1985

[54] STOPPING DEVICE IN SPARE WHEEL HOLDING APPARATUS

[75] Inventors: Setsuo Yasue, Gifu; Tomio Yamamoto, Aichi, both of Japan

[73] Assignee: Sanko Kiki Kabushiki Kaisha, Aichi, Japan

[21] Appl. No.: 470,719

[22] Filed: Feb. 28, 1983

Related U.S. Application Data

[63] Continuation of Ser. No. 203,853, Nov. 4, 1980, abandoned.

[30] Foreign Application Priority Data

Nov. 12, 1979 [JP] Japan ................................. 54-146280

[51] Int. Cl.³ .............................................. B62D 43/04
[52] U.S. Cl. ...................................... 414/463; 294/93; 403/254; 403/330
[58] Field of Search ....................... 224/42.06, 310, 273, 224/42.12, 42.19, 42.21, 42.24, 42.25, , 42.26, 42.27, 42.28, 42.29, 42.3; 294/82 AH, 93; 414/463, 464, 465, 466, 426, 427, 723, 540, 724; 403/330, 254; 296/37.2

[56] References Cited

U.S. PATENT DOCUMENTS

| | | | |
|---|---|---|---|
| 1,883,032 | 10/1932 | Smith | 224/42.24 X |
| 2,003,853 | 6/1935 | Burnett et al. | 224/42.24 |
| 2,325,848 | 8/1943 | Gildea et al. | 414/463 |
| 2,661,130 | 12/1953 | Evans | 414/463 |
| 2,931,549 | 4/1960 | Adkins | 224/42.24 |
| 4,059,197 | 11/1977 | Iida | 414/463 |

FOREIGN PATENT DOCUMENTS 1113372  8/1961  Fed. Rep. of Germany ...... 414/463

Primary Examiner—Frank E. Werner
Attorney, Agent, or Firm—Koda and Androlia

[57] ABSTRACT

A stopping device in a spare wheel holding apparatus in which a spare wheel can be held to a support member by one stationary stopper and one movable stopper. The stationary stopper is mounted on one end of the support member and has a stopping surface in the shape of an inverted "L" adapted to hold the edge of a hole on a disk wheel of the spare wheel. The movable stopper is pivotably mounted on the other end of the support member and is held in an upright position by a spring. The upper part of the movable stopper, which extends above the support member, has a stopping surface in the shape of an inverted "L" adapted to hold the edge of a hole in the disk wheel and can tilt in the opposite direction from the stopping surface. Also, in a second embodiment, both of the stopping surfaces are movable.

2 Claims, 7 Drawing Figures

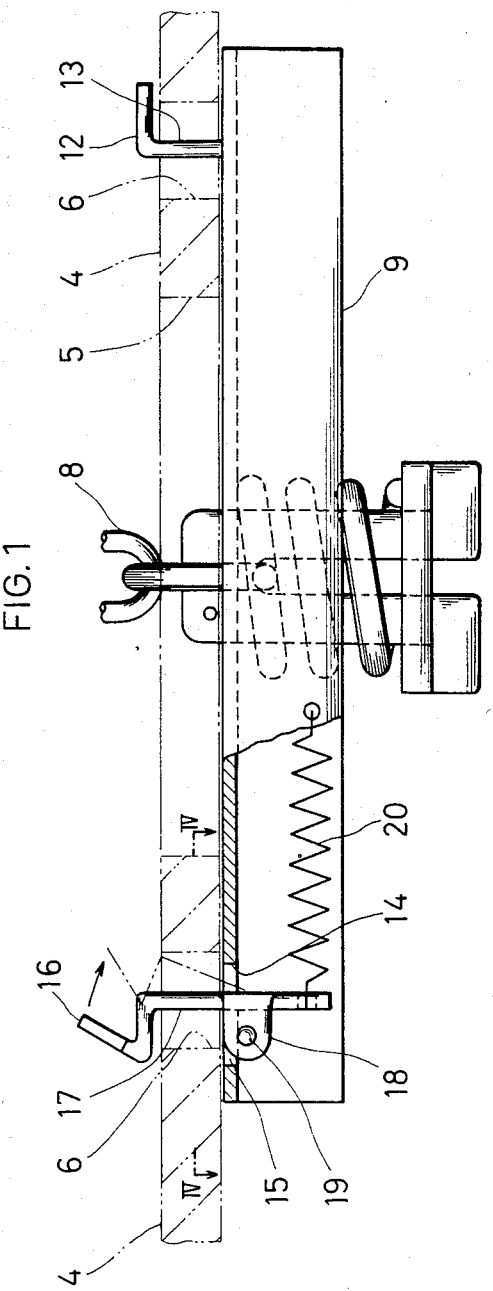
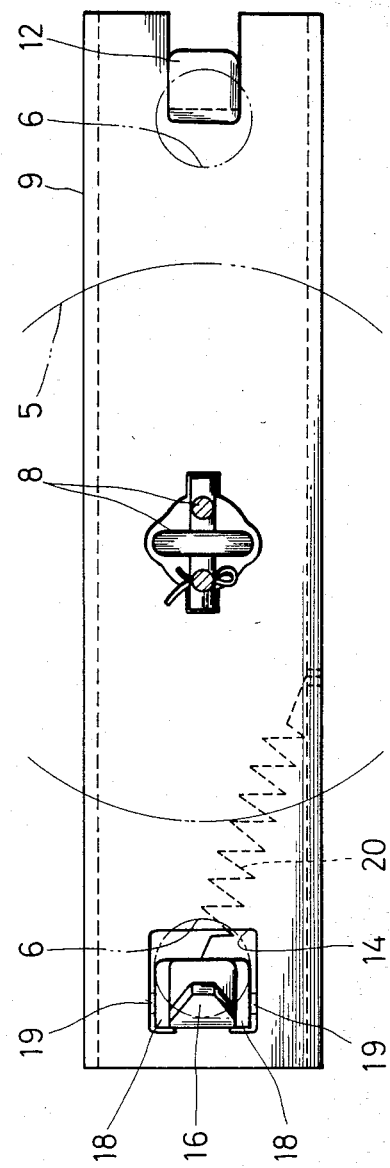

STOPPING DEVICE IN SPARE WHEEL HOLDING APPARATUS

This is a continuation of application Ser. No. 203,853, filed Nov. 4, 1980, now abandoned.

BACKGROUND OF THE INVENTION

This invention relates to a stopping device which holds a spare wheel to a support member in a spare wheel holding apparatus, in which the center of the support member is connected to the lower end of a flexible suspending member which is made to move up and down by a winch.

The stopping device known in the prior art comprises two stationary stoppers in the forms of "I" or inverted "L" which are mounted on both ends of a support member adapted to make contact or to hold the edge of a hub-hole or a fixing hole in the disk wheel of a spare wheel. In such device, the spare wheel comes off the support member by the vibrations of the automobile, if the spare wheel which is raised by a winch underneath the chasis of the automobile is not pressed against a tyre holding member tightly. In order to hold the spare wheel securely to the support member, a device which comprises two stationary stoppers which are mounted on both ends of a support member, and two movable stoppers which are pivotably mounted and held in upright position by a spring on both ends of the support member, has been invented. But in the stopping device, all of the stationary stoppers and the movable stoppers have to be made to make contact and to hold the edge of the hub-hole. This makes the operations of mounting and dismounting the spare wheel complicated and the structure of the device also becomes complicated. And another device in which the stoppers are made out of spring steel has been invented but a spare wheel can not be held securely to the support member because the stoppers may be deformed easily.

SUMMARY OF THE INVENTION

The object of the present invention is to solve the above stated problems of the devices in the prior art and to provide a stopping device in a spare wheel holding apparatus which is simple in structure and operation and can hold a spare wheel securely.

This invention provides a stopping device in a spare wheel holding apparatus which comprises one stationary stopper and one movable stopper. The stationary stopper is mounted on one end of a support member and has a stopping surface in the shape of an inverted "L" adapted to hold the edge of a hole on the disk wheel of a spare wheel. The movable stopper is pivotably mounted on the other end of the support member and is held in a vertical position by a spring. The upper part of the movable stopper, which extends about the support member, has a stopping surface in the shape of an inverted "L" adapted to hold the edge of a hole in the disk wheel and can tilt in the direction opposite from the stopping surface. The spare wheel is secured to the support member by one stationary stopper and one movable stopper. Since the stopping device in this invention uses one stationary stopper and one movable stopper to secure a spare wheel to the support member, the operation and the structure of the said device are much simpler compared to the devices known in the prior art which use two stationary stoppers and two movable stoppers. Since the movable stopper is tiltably mounted in a vertical position with a spring, the spare wheel can be mounted in a more secure manne compared to the devices in the prior art on which the stoppers are made out of spring steel.

This invention also provides a stopping device in a spare wheel holding apparatus which comprises two movable stoppers. The two movable stoppers are pivotably mounted on both ends of a support member and are held in a vertical position by a spring. Each upper part of the stoppers, which extends above the support member, has a stopping surface in the shape of an inverted "L" adapted to hold the edge of a hole in the disk wheel of a spare wheel and can tilt in the direction opposite from each stopping surface. The spare wheel is secured to the support member by two movable stoppers. Since the stopping device in this invention uses two movable stoppers to secure a spare wheel to the support member, the operation and the structure of said device are much simpler compared to the devices known in the prior art which use two stationary stoppers and two movable stoppers. Since the movable stoppers are tiltably mounted in vertical positions with a spring, the spare wheel can be mounted in a more secure manner compared to the devices in the prior art on which the stoppers are made out of spring steel.

DESCRIPTION OF THE DRAWINGS

FIG. 1 shows a front elevation, partly in cross section, of a stopping device of the first embodiment of this invention.

FIG. 2 shows a top view of the same stopping device.

DETAILED DESCRIPTION OF THE INVENTION

First Example of the Embodiments (FIG. 1 to FIG. 5)

Figure 3:
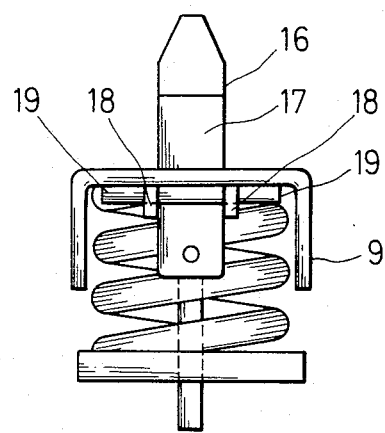
FIG. 3 shows a left-side elevation of the same stopping device.
Figure 4:
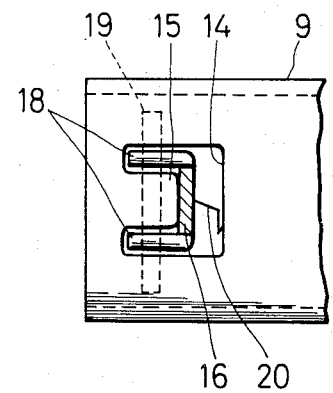
FIG. 4 shows the cross section in the direction of IV—IV in FIG. 1.
Figure 5:
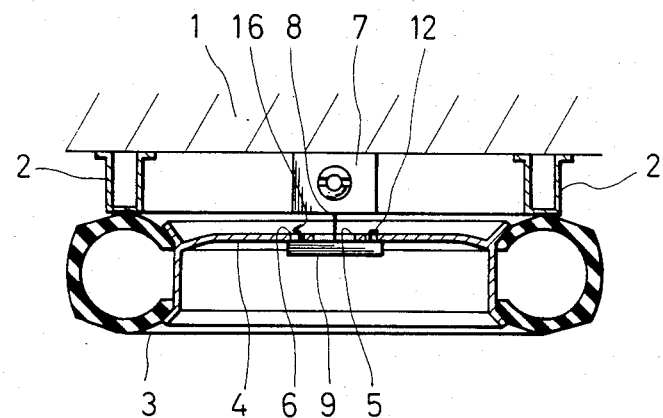
FIG. 5 shows a front elevation, partly in cross section, of the same stopping device in use.

The stopping device in this example has a support member 9, as shown in FIG. 1 and FIG. 2, which is made into a channel bar with a cross section of " ⊓ " shape, as shown in FIG. 3. The center of the support member 9 is connected to the lower end of a flexible suspending member or chain 8 which is moved up and down by a winch 7 mounted underneath the chasis 1 of an automobile, as shown in FIG. 5. On one end of the support member 9, a stationary stopper 12 is mounted on the top plate, as shown in FIG. 1 and FIG. 2. The outside surface of the stationary stopper 12 has a stopping surface 13 formed in the shape of an inverted "L", as shown in FIG. 1. On the other end of the support member 9, a through hole 14 in the shape of " ⊐ " is provided on the top plate, as shown in FIG. 4. A movable stopper 16, the top section of which is bent in the shape of " ⌐ " is inserted in the through hole 14, as shown in FIG. 1 and FIG. 2. There are two shaft-holders 18 extending parallel from the bottom on both sides of the movable stopper 16. A pivot shaft 19 goes through the holes on the shaft-holders 18 and is welded onto the bottom surface of the top plate of the support member 9, so that a stopping surface 17 in the shape of an inverted "L" on the upper part of the movable stopper 16 is extending from the top plate and is facing outside, and the said movable stopper is pivotably mounted on the support member 9. The lower part of the movable stopper 16 which is placed inside the support member 9 with " ⊓ " shaped cross section and the middle section of the side plate of the support member 9 are connected by a stretched coil spring 20, so that the outside surface of the movable stopper 16 on the upper position of the pivot-shaft 19 is pressed against the tip of an extension 15 which is positioned between the shaft-holders 18 of the movable stopper 16 on the top plate of the support member 9, as shown in FIG. 4. The movable stopper is now supported in a vertical position and the top section extending which forms the stopper surface 17 can only be tilted in the opposite direction from the stopping surface 17 towards inside. The support member 9 has the stationary stopper 12 on one end and the movable stopper on the other end.

In order to use this stopping device, the support member 9 is lowered by unwinding the winch 7 and placed on the inside or lower surface of the disk wheel 4 of a spare wheel 3 on the ground after it is inserted through a hub-hole 5 at the center of the disk wheel 4. Then the stationary stopper 12 is inserted in a fixing hole 6 which is provided around the hub-hole 5 of the disk wheel 4, so that the stopping surface 13 of the stationary stopper is holding the edge of the fixing hole 6, as shown by the dash lines in FIG. 1. Then the inclined and tapered tip section of the movable stopper 16 is placed on the edge of the lower opening of another fixing hole 6 of the disk wheel 4 and the end of the support member on which the movable stopper 16 is pivoted is pressed against the disk wheel 4. The bent tip section of the movable stopper 16 is inclined towards inside and moved back to the vertical position again when the movable stopper is inserted fully in the fixing hole 6. Now, the stopping surface 17 of the movable stopper 16 is holding the edge of the fixing hole 6, so that the spare wheel 3 is held to the support member 9 by the stationary stopper 12 and the movable stopper 16. Then the spare wheel 3 which is held on the support member 9 is raised by winding the winch 7 so that the spare wheel is pressed against a tire holding member 2 which is fixed underneath the chasis 1, as shown in FIG. 5.

In order to remove the spare wheel from the support member 9, the spare wheel 3 on the support member 9 is lowered into the ground by unwinding the winch 7. Then the stopping surface 13 of the stationary stopper 12 is disconnected from the edge of the fixing hole 6, the stationary stopper is removed from the fixing hole 6 and the stopping surface 17 of the movable stopper 16 is disconnected from the edge of the fixing hole 6, the movable stopper is removed from the fixing hole 6. Then the support member 9 is removed from the disk wheel 4 through the hub-hole 5.

Figure 6:
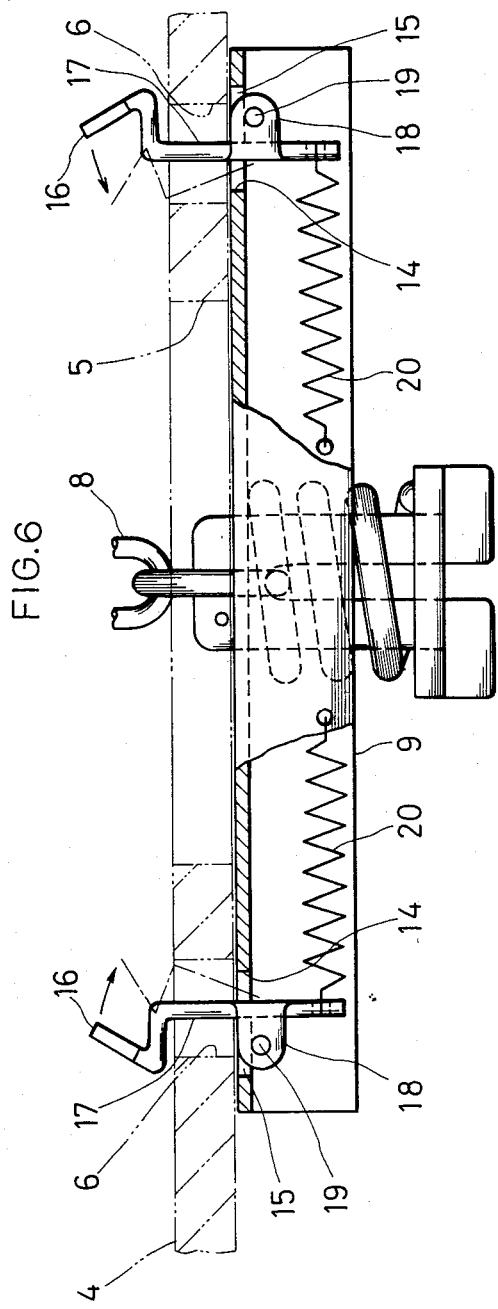
FIG. 6 shows a front elevation, partly in cross section, of a stopping device of the second embodiment of this invention.
Figure 7:
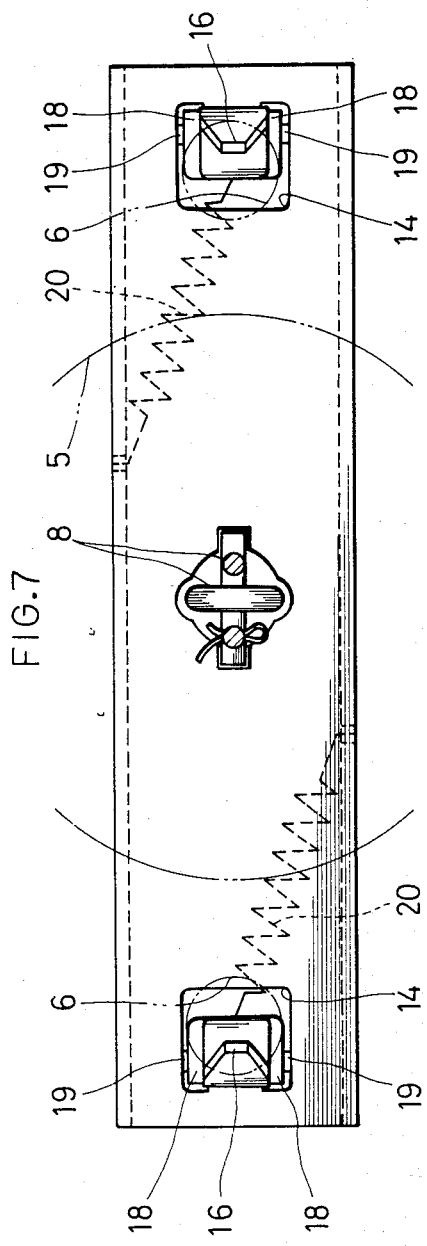
FIG. 7 shows a top view of the same stopping device.

Second Example of the Embodiments (FIG. 6 and FIG. 7)

The stopping device in this example has a movale stopper 16 on one end of the support member 9 which is similar to the movable stopper on the other end of the support member instead of the stationary stopper which is found in the first example. Two movable stoppers 16 are mounted symmetrically on both ends of the support member 9, as shown in FIG. 6 and FIG. 7. The same parts which are also used in the first example are numbered with the same codes and the descriptions of such parts are omitted.

The method of using this example of the embodiments is similar to that of the stopping device in the first example of the embodiments as shown by the dash lines in FIG. 6. The spare wheel is held to the support member 9 by two movable stoppers 16.

The stopping devices in the first and second examples of the embodiments contain the stationary stopper 12 and the movable stopper 16 or the movable stopper 16 and the movable stopper 16 in the positions in which the stoppers can be connected to the fixing holes 6 on the disk wheel 4 of the spare wheel. One of the stoppers or the both of them may be placed in positions where the stoppers can be connected to the hub-hole 5 of the disk wheel 4.

The lower parts of the movable stoppers 16 are connected to the middle sections of the side plates of the support member 16 by the stretched coil springs 20 in the stopping device in the second example of the embodiments. The lower parts of the movable stoppers may be connected to each other by a stretched coil spring.

What is claimed is:

1. An apparatus for holding a spare wheel for a motor vehicle wherein the spare wheel includes a wheel disk with wheel mounting holes therethrough, said apparatus comprising an elongated spare wheel support member having a " ⊓ " shaped cross-section;
a winch provided on said motor vehicle;
a flexible suspending member having one end coupled to said winch such that said suspending member can be wound up or unwound from said winch;
a resilient means for coupling another end of said suspending member to a center of said support member;
a stationary stopper of an inverted "L" shape provided adjacent one end of and formed integrally with said support member, said stationary stopper for engaging with one of said mounting holes in said spare wheel disk;
a hole provided in a top surface of said support member adjacent another end of said support member;
a movable stopper of a " " shape pivotally coupled to said support member and extending through said hole, said movable stopper being coupled to said support member such that a "<" shaped portion of said " " shape extends away from said center of said support member and such that said movable stopper is pivotable towards said center of said support, said movable stopper being engageable with another mounting hole in said wheel disk; and
a tension spring coupled between an end of said movable stopper and a side of said support member for biasing said movable stopper in a direction away from said center of said support member;
whereby said spare wheel is mounted on said support member by first passing said supporting member through a central hole in said wheel disk, then engaging said one mounting hole with said stationary stopper and then pressing said wheel disk against said movable stopper to cause said movable stopper to pivot towards said center of said support member, to fit through said another mounting hole and return to hold said wheel disk securely such that said wheel and support can be wound up by said winch.

2. An apparatus for mounting a spare wheel to a motor vehicle wherein spare wheel includes a wheel disk with mounting holes therethrough said apparatus comprising:

an elongated spare wheel support member having a " " shaped cross-section;

a winch provided on said motor vehicle;

a flexible suspending member having one end coupled to said winch that said suspending member can be wound up or unwound from said winch;

a resilient means for coupling another end of said suspending member to a support member;

a pair of holes provided in a top surface of said support member, each of said holes being provided adjacent one end of said support member;

a pair of movable stoppers of a " " shape pivotally coupled to said support member and each extending through one of said pair of holes, said movable stoppers being coupled to said support member such that a "<" shaped portion of said " " shape extends away from said center of said support member and such that when said movable stoppers are pivotable towards said center of said support member, said movable stoppers are in engagement with two mounting holes in said wheel disk; and a pair of tension springs each coupled between an end of one of said movable stoppers and a side of said support member for biasing said movable stoppers in a direction away from said center of said support member;

whereby said spare wheel is mounted on said support member by passing said support member through a central hub-hole in said wheel disk and pressing said wheel disk against said pair of movable stoppers to cause said movable stoppers to pivot towards said center of said support member to fit through said mounting holes and return to hold said wheel disk securely such that said wheel disk and support can be wound up said winch.

* * * * *